Feb. 22, 1966   F. W. CHURCH ETAL   3,236,327
SOUND LEVEL TIME INTEGRATOR
Filed June 11, 1962                           2 Sheets-Sheet 1

Franklin W. Church
Lawrence W. Raymond   Inventors

By  *E. M. Thomas*

Patent Attorney

Feb. 22, 1966    F. W. CHURCH ETAL    3,236,327
SOUND LEVEL TIME INTEGRATOR
Filed June 11, 1962    2 Sheets-Sheet 2

Franklin W. Church
Lawrence W. Raymond    Inventors

By /s/ E. M. Thomas    Patent Attorney

United States Patent Office 3,236,327
Patented Feb. 22, 1966

3,236,327
SOUND LEVEL TIME INTEGRATOR
Franklin W. Church, Fanwood, N.J., and Lawrence W. Raymond, New York, N.Y., assignors to Esso Research and Engineering Company, a corporation of Delaware
Filed June 11, 1962, Ser. No. 201,554
4 Claims. (Cl. 181—.5)

The present invention relates to a sound level time integrator, that is, to a device for determining quantitatively the exposure of personnel to relatively high levels or intensities of noise for extended periods of time.

In many industrial operations of a character such as to produce loud noises or continuous noise at varying levels, concern is felt for the possible and sometimes actual damage to hearing of workmen and other personnel exposed to noise for extended periods of time. Operators of industrial plants are always concerned with measures to avoid any unnecessary discomfort to their workmen. They are and should be particularly concerned with preventing situations which may lead ultimately to permanent hearing damage of their employees. Equipment for the study of sound frequency and intensity levels has been standardized in certain particulars as set forth in the American Standard Specification for General Purpose Sound Level Meters, approved January 1, 1961 by the American Standards Association.

The factors leading to hearing damage in human beings working in evironments of high noise levels are not perfectly understood at this date. However, considerable knowledge has been accumulated in recent years. It is known that certain band frequencies of sound are more injurious than others, that high levels of sound are not only uncomfortable but can be immediately injurious, and that long sustained sound levels below those tolerable for short time periods can be permanently damaging to hearing. Unfortunately not all persons are capable of sensing by ear the depths, qualities or levels of sounds and noises which may be injurious to themselves or to others.

A number of instruments have been proposed in the past for determining critical sound levels. Proposals have been made for selecting frequency bands as well as intensity levels of sound for study and analysis in efforts to avoid, or at least to minimize those characteristics which appear to be injurious. Considerable progress has been made in recent years in ascertaining, recognizing, and controlling sound levels and types of the most harmful varieties, but further progress is needed. A particular object of the present invention is to make further improvements in the detection and analysis of total noise dosage (i.e., including a factor of time as well as of sound intensity). Such studies are essential to better understanding of damage to hearing caused in industry. They are prerequisite to corrective measures. Subjection of persons to actual impact of sound in intensity and in duration must be more definitely ascertained before fully corrective steps can be taken.

Specifiic instruments of various types have been proposed in the past for measuring the intensity of sound, for example, in decibels. Some have been suggested also for recording in some manner the periods of time over which high level noises are continued, for example, during the day or other working period where personnel are exposed to the sound levels, e.g., in metal manufactures, engine test facilities, etc. In one instance at least, an instrument has been designed to record only the sound level peaks; that is, noise levels in decibels were recorded only when above certain predetermined standards. It has also been suggested that use be made of the detection of such noise intensity levels to start and stop timing operations. A typical instrument specifically designed for this purpose, however, proved to be very complicated and massive. One proposed device was not always operative since it depended on the mechanical stopping and starting of a conventional type watch as the ambient noise level passed through the critical range. Timing devices such as watches and clocks, which depend on movement of balance wheels, pendula, and the like, frequently fail to start when released. They often require a slight motion or impulse which may be given instinctively by a human operator, but which often is not available at the correct instant in automatic recorders. Devices of this character, therefore, have not been very satisfactory. It is possible, of course, to produce self-starting timers, but reliable ones are extremely expensive. Furthermore, to start and/or stop, they usually require mechanical forces of magnitude not available in small electronic detectors and transducers.

It has also been suggested that the integrated product of noise and time, which product is of great concern in causing damage to hearing of workmen in noisy areas, might be integrated, e.g., by simulating, estimating or calculating the mathematical area under a curve. In such a curve, time may be the abscissa and noise level the ordinate. Such an arrangement, however, does not distinguish between high levels of sound intensity for short periods, and lower levels for longer periods. Moreover, the total time during which the noise intensity level is above the critical range appears to be more important than the true product of time and intensity. Once it is ascertained that a certain objectionable sound level is being reached in a working environment, it is important to determine its duration or time dosage. It is a very useful to know with reasonable accuracy how much time or what portion of a working day, for example, may involve such sound levels.

It appears also that certain frequency bands of noise or sound are more damaging at high levels than others. Here again, however, total dosage or total time of exposure is a very important factor which has not been adequately investigated in the past because of instrument limitations. One object of this invention, therefore, is to obtain total time exposure or dosage of noise at predetermined intensity levels and also within selected frequency bands. By the use of the present invention, such dosage may be readily and directly determined.

It is another object of the present invention to record directly and essentially on a linear basis, the time during which sound levels in general, or within selected frequency bands, are at or above a critical or danger level. Critical or danger levels, frequency bands, etc., may be further classified into several categories, depending on the sensitivity of the worker, the degree to which temporary hearing damage or discomfort may be tolerated, etc.

It is also desirable in some cases to be able to record or totalize in a single operation the time during which sound or noise intensity levels may have reached several different significant values. A still further object of the present invention, therefore, is to measure simultaneously and/or selectively various sound characteristics, including but not limited to noise levels, and to record or quantize the total time or times during which these selected levels are exceeded during a limited or specified period of time, such as a working day or working week.

For practical purposes, especially in studying the environment of individual workers, in order for such a sound level time recorder or noise quantizer to be useful, it must be a device which can be located continuously with the workman or the person making the noise level survey. Obviously the insensity of sound or noise varies with distance from its source or sources, and ambulatory workmen or investigators will frequently move position with respect to such sources. Hence the noise quantizer should be highly portable and preferably small enough that it can be worn or carried comfortably by attachment to the person or his clothing without interfering substantially with his normal operations or occupation. While this desideratum has been mentioned by prior investigators, it has not hitherto been achieved in practices as far as the present inventors are aware.

One important reason for failure in the past to achieve the desired compactness, i.e. pocket size or similar, and good reliability in a sound-time integrator or noise quantizer, is the fact that suitable timing devices have either not been available or have been prohibitively expensive. Difficulty with stop watches, etc., has already been mentioned and other recording devices have tended to give undue weight to high intensity levels and less to time factors.

According to the present invention, the system is so designed that once the critical noise or sound level is attained, an electric circuit is established. This operates through substantially constant resistance at constant potential, thereby giving a uniform and constant current. In essence, such provides a "go" or "no-go" recording operation. Time is recorded when the critical level is reached and is not recorded below that level. This constant current preferably is utilized to operate an amperetime metering device, for example, an electrolytic or electrochemical cell of suitable type, so that the time of current flow as measured by quantitative chemical action can be precisely determined in a very small and completely reliable indicating apparatus. Hence a further object of the invention is the provision of a simple and reliable time recorder operable under substantially constant conditions at all times when a selected sound level is reached.

The invention will be more fully understood by reference to the attached drawings in which.

Figure 3:
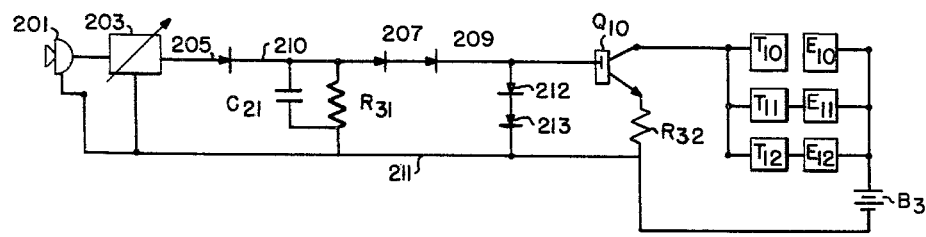
Figure 4:
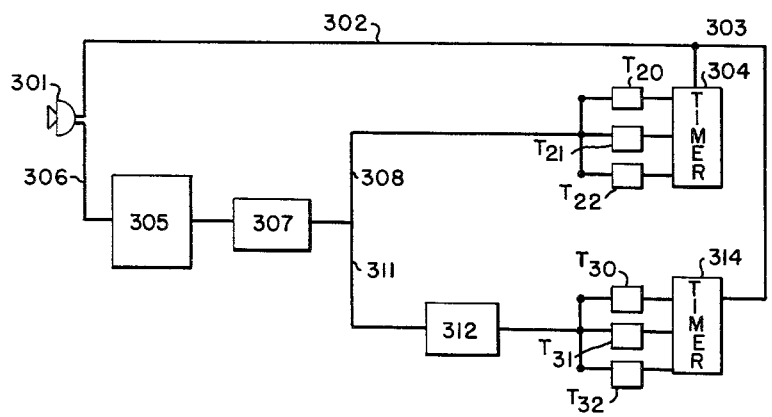

FIG. 3 is a diagrammatic view of a system adapted for sensing and recording a plurality of sound levels simultaneously; and FIG. 4 is a diagrammatic view of a somewhat more complex or sophisticated model suitable for more detailed noise-time analysis and study, both of multiple sound levels and of selected frequency bands, adapted also for sustained use or permanent installation in areas where long range studies or long range control systems are needed.

Figure 1:
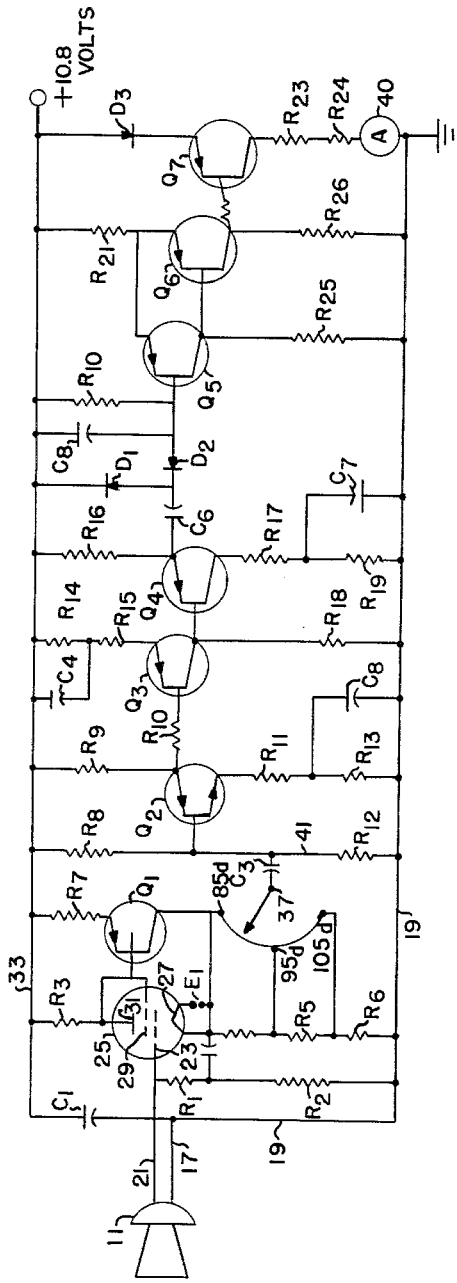
FIG. 1 shows diagrammatically a noise quantizer typical of the present invention.

Referring now to FIG. 1, the apparatus comprises a microphone 11 of any suitable type. This is conducted through suitable leads 17, 21 which attach to the appropriate electronic elements for energizing a recording circuit when the sound intensity at the microphone reaches the level to be recorded.

The lower lead 17 is connected to a main conductor 19 which forms the ground potential of a number of electric circuits to be described. The upper lead 21 connects to the control grid 23 of a suitable electronic device 25 which may be a vacuum tube having a filament 27, a modifier screen grid 29, and a plate 31.

The positive side of the main circuit indicated at 33 is connected to lead 19 through condenser $C_1$ which, in one example, may have a capacitance of 150 mf. A suitable E.M.F. is placed across lines 19, 33, e.g. at the right of FIG. 1. The microphone lead 21 is connected through a small resistor $R_1$ which may have, for example, a capacity of ¼ watt and a resistance of about 20 or 22 megohms. This connects to a further resistor $R_2$ of about 10 megohms resistance, which connects to ground lead 19. A battery or other energy source $E_1$ is located so as to produce a suitable voltage on filament 27, the other terminal of which is connected through condenser $C_2$, about 0.1 mf., between $R_1$ and $R_2$.

The plate 31 of the vacuum tube 25 connects to lead 33 through resistor $R_3$. This may, for example, have a resistance of about 27 kilo-ohms.

Directly between the filament 27 and the main grounded conductor 19 are three resistors in series, $R_4$ about 700 ohms, $R_5$ about 200 ohms, and $R_6$ about 100 ohms. The purpose of these will be explained below.

The screen grid 29 of tube 25 is connected to a conductor from the plate to the base of a PNP transistor $Q_1$. This may be of type such as 2N404. The emitter terminal of the transistor is connected through resistor $R_7$ to power lead 33, and its collector connects to the positive terminal of resistor $R_4$ which also serves as one terminal of the filament 27.

Contact terminals indicated at $85d$, $95d$ and $105d$ are connected respectively to the output of transistor $Q_1$, as just mentioned, to a lead intermediate between resistors $R_4$ and $R_5$, and to a lead intermediate between resistors $R_5$ and $R_6$. The purpose of these contacts is to provide for selectively setting the critical sound level at various values, for example, 85 decibels in the case of the transistor output, 95 decibels in the second contact, and 105 decibels for the third.

The contactor 36 may be preferably of the plug-in type, but as shown diagrammatically it is movable about a pivot 37 to make electrical connection with any one of the three contact points $85d$, etc., just mentioned. It is connected through a condenser $C_3$, to a lead 41, a suitable size being about 50 mf., at 3 volts.

Figure 2:
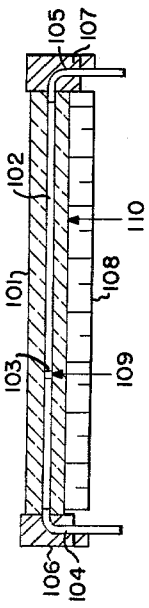
FIG. 2 is a detailed vew, partly in section, of a time recording cell or unit of the quantizer or integrator.

The output of the system so far described can be taken through condenser $C_3$ for suitable amplification and subsequent triggering. When sound level reaches or exceeds the setting of contactor 36, e.g., 85 decibels, the constant potential between leads 33 and 19 (10.8 volts) will supply a constant current through a time recorder device A, indicated at 40. The details of this device A are shown in FIG. 2 and will be explained below.

The conductor 41 runs between resistors $R_8$ and $R_{12}$ which connect respectively to power line 33 and ground line 19. $R_8$ may appropriately have a resistance of about 120 kilo-ohms and $R_{12}$ of about 40 kilo-ohms, both being of ¼ watt capacity in a specific example.

Conductor 41 also is connected at or near its midpoint to the base of an PNP transistor $Q_2$, whose other terminals are connected respectively to resistors $R_9$ and $R_{11}$. $R_9$ connects to line 33. The upper or collector terminal of $Q_2$ also connects to a resistor $R_{10}$, which in turn connects to the base of another PNP transistor $Q_3$. The latter may be of the same specific type as transistor $Q_1$, whereas $Q_2$ is preferably of type such as T1494. The other terminal of resistor $R_{11}$, which is typically of about 330 ohms resistance, is connected to the ground lead 19 through a resistor $R_{13}$ and a condenser $C_5$ in parallel. $R_{13}$ is about 10 kilo-ohms in the specific example and $C_5$ has a capacity of about 50 mf., 3 volts.

The collector terminal of transistor $Q_3$ is connected to ground through resistor $R_{18}$ and at the emitter to the lead 33 through condenser $C_4$ and resistors $R_{14}$ in parallel, plus $R_{15}$ in series. Condenser $C_4$ is typically of 200 mf. capacity, $R_{14}$ is about 680 ohms, and $R_{15}$ is selected to balance the other components as required.

The collector of transistor $Q_3$ connects to the base of another PNP transistor $Q_4$, preferably of type 2N679. The collector lead of the latter connects to the hot line 33 through resistor $R_{16}$, which is preferably inversely variable in resistance with temperature. This is preferably designed to balance out resistance variables due to temperature changes. A thermistor of type 32D12 is suitable here. The emitter lead of transistor $Q_4$ connects to the ground through a resistor $R_{17}$, in series with resistor $R_{19}$ and condenser $C_7$ which are in parallel. $R_{17}$ is typically of about 70 ohms resistance, $R_{19}$ one kilo-ohm, and $C_7$ has a capacity of 150 mf., at 6 volts.

The collector lead of transistor $Q_4$ connects through condenser $C_6$ of about 50 mf. capacity, 3 volts, which in turn connects to the input lead of a diode $D_1$ and the output lead or plate of another diode $D_2$. These are both suitably of type ASG-6. The plate of $D_1$ connects to the power lead 33 and the input side of $D_2$ connects to the same lead through a condenser $C_8$ of about 300 mf. capacity, 3 volts. The latter is in parallel with a resistor $R_{20}$, suitably of about 10 kilo-ohms resistance. The latter connects to the base of a further PNP transistor $Q_5$, the input lead of which is connected to the power line 33 through resistor $R_{21}$ of about 100 ohms resistance. The output of $Q_5$ is connected to ground through resistor $R_{25}$, 12 kilo-ohms, and also is connected to the base of PNP transistor $Q_6$. The emitter of the latter is connected with $R_{21}$ and its collector connects to ground through resistor $R_{26}$, suitably of about 5.6 kilo-ohms. The collector of $Q_6$ is also connected to the base of another PNP transistor $Q_7$ which receives its emitter power through diode $D_3$ connected to the positive terminal 33. The latter is suitably at a potential of 10.8 volts as compared to ground. In effect $Q_7$ acts as a limit valve, no current flowing through A unless and until the potential on its base permits current to flow. The collector of $Q_7$ connects through resistance, shown as two resistors $R_{23}$, $R_{24}$ in series, although of course these may be combined if desired into a single resistor of about 1800 ohms.

When the signal from the microphone is of sufficient intensity, current from $R_{24}$ passes through the timing cell A indicated at 40, which records the total time that the bias on $Q_7$ is at or above the indicated level. It will be understood that the circuit consisting of $Q_5$ and $Q_6$ constitutes a triggering device for $Q_7$, or a "Schmitt trigger" or equivalent, which permits current to flow from 33 through the recorder 40. This can occur only when the pointer 36 is connected to one of the leads 85d, 95d, or 105d, and when the signal is equal to or greater than the chosen setting of 85 decibels, etc. For each particular connection chosen, the time during which the noise level at the microphone exceeds the particular decibels value selected, i.e., 85 db, 95 db, or 105 db, is recorded. Times where noise or sound level is below the selected value will not be recorded. The recording device itself will next be described.

A specific form of recording device, known per se for other types of recording, is a miniature ampere hour meter which operates on the principle of electrochemical transfer of conductor material across an electrolyte gap. One such device is available from Curtis Instruments, Inc., of Mount Kisco, New York. It consists of a capillary tube filled with mercury except for a small gap of a mercury salt electrolyte. As current flows, metallic mercury is transferred across the gap and the gap moves along a scale, the rate of movement being determined by the current, and the extent of displacement being directly proportional to the total time during which current flows. When current is not flowing, the gap does not move. At a constant potential, current flows, if at all, at a constant rate. Hence the device may be considered either an ampere hour meter or a watt hour meter.

Specifically, FIG. 2 shows in section a glass capillary tube 101 having its bore 102 filled with mercury except for a narrow gap 103. The latter is filled with aqueous solution of a mercury salt such as $HgCl_2$. Leads 104 and 105 are connected hermetically to the ends of the mercury column, being embedded in a block of suitable insulating sealer material 106, 107 at either end. As current flows, mercury is transferred, e.g., fom right to left, and gap 103 moves from left to right. Thus, if scale 108 represents 10 minutes current flow for each major subdivision, the gap will move from arrow 109 to arrow 110 in 30 minutes. By reversing the polarity, the gap will move in the opposite direction.

Figure 2A:
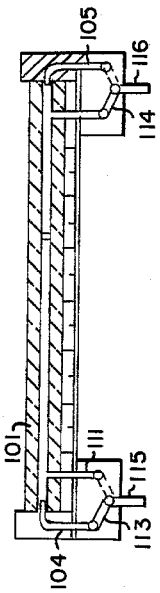
FIG. 2A is a view similar to FIG. 2 of a modified time recorder.

One disadvantage of the recording apparatus of FIG. 2 is that it is usually rendered useless if all of the mercury is transferred to one side of the gap. It cannot then start in the opposite direction. In FIG. 2A a modification is shown to prevent this. The device is essentially the same as that of FIG. 2, except that an extra pair of electrode probes 111, 112 is provided near, but not at the ends, of the mercury column. Small switches 113 and 114 are provided so that during normal use, assuming the gap is moving to the right electrode or probe 112 is connected to the terminal 116 by switch 114, whereas the other terminal 115 is connected by switch 113 to outer electrode 104 at the left. With this setting, the gap will move to the right until it reaches probe 112 and will stop. By reversing polarity, the gap will move to the left again when switch 114 is connected to electrode 105. (At this time switch 113 would be moved to the dotted line position connecting to probe 111.) By this arrangement, over-run of the recorder is prevented and its useful life considerably extended. The switches can, of course, be interconnected or ganged to simplify controls.

Switches 113 to 116 can be omitted in FIG. 2A if desired and the unit unplugged and reversed by simply plugging electrodes 111, 112 in the reverse sockets, provided the mercury column has not been driven too far. If the gap has reached an electrode 111 or 112, the device can be reversed by attaching a current source, such as a battery, to terminals 104, 105. Ordinarily these will not be used because the operator normally will reverse the recorder before the electrolyte gap has reached a terminal.

Referring now to FIG. 3, there is shown an arrangement for recording simultaneously the total time or times during which sound or noise levels equal or exceed a plurality of predetermined critical values. The apparatus is shown diagrammatically for brevity, but it will be understood that it will be of the same general type as that described in FIG. 1 or of equivalent arrangement, which will be obvious to those skilled in the art. The principal difference is that for each critical sound level to be recorded, a separate recorder activating device, or "trigger," will be supplied.

A microphone 201 is connected to a suitable amplifier indicated by the variable unit 203 and supplemented by suitable diodes 205, 207, 209, and a tuned circuit comprised of a condenser $C_{21}$ and a resistor $R_{31}$. The tuned circuit extends between the primary leads 210 and 211, which are also connected by a pair of diodes 212 and 213 providing for unidirectional current flow. The upper lead 210 is connected to the base of a transistor $Q_{10}$. Transistor $Q_{10}$ is connected through its collector lead to a branched circuit comprising three trigger-recorder units indicated respectively at $T_{10}$, $T_{11}$ and $T_{12}$, the recorders being designated $E_{10}$, $E_{11}$ and $E_{12}$.

The emitter of transistor $Q_{10}$ connects to a resistance $R_{32}$, which also connects to lead 211 and to the negative terminal of a suitable battery $B_3$.

The equipment just described amplifies the signal at the microphone 201 and applies it to the three triggering circuits, $T_{10}$, $T_{11}$ and $T_{12}$. These may have any desired values, but for examples they may be set, respectively, to operate at 85 db, 95 db, and 105 db. When the sound level at the microphone exceeds 85 db, recorder $E_{10}$ will run and record elapsed time at or above this level. In case the sound intensity reaches or exceeds 95 db, recorder $E_{10}$ will continue to operate but recorder $E_{11}$ will also operate as long as the sound level is at or above 95 db. Similarly, if the sound level reaches 105 db, recorder $E_{12}$ will operate. The finished record then will show total time at or above 85 db, plus total time at or above 95 db, plus total time at or above 105 db. By comparison and analysis of the three records, the frequency and duration of sound levels may be further studied.

Now referring to FIG. 4, an arrangement is shown which is essentially the same as that in FIG. 3. It includes a microphone 301 connected through a lead 302 to a terminal 303 connected to a timer 304. The latter preferably comprises three timing units and is essentially equivalent to units $E_{10}$, $E_{11}$ and $E_{12}$ of FIG. 3.

The microphone passes its signals to the amplifier 305 connected to its other terminal 306, and on through suitable transmitting or modifying equipment 307 to the branched circuit comprising leads 308 to the time totalizer 304 just described. Triggering circuits $T_{20}$, $T_{21}$ and $T_{22}$ are equivalent to those of FIG. 3 and operate selectively in the same manner so that different intensity levels of sound or noise will be recorded.

The other branch 311 passes the signals from microphone 301, suitably amplified, to a band pass filter unit 312. The latter is selected to pass on the desired frequency band which is to be studied. Different filters may be inserted at this point selectively in order to study various band frequencies and band widths as desired. This is particularly useful in the comprehensive study of the effect of sounds of various frequencies or frequency ranges, in addition to the study of sound intensity and its duration.

The signal from the band pass filter is taken to the several triggering devices $T_{30}$, $T_{31}$ and $T_{32}$ and, depending on intensity, passes through these devices to the multi-unit timer 314. The latter operates in the same manner as the multiple recorders $E_{10}$, $E_{11}$ and $E_{12}$ of FIG. 3. Suitable electromotive forces and circuit balancing components are installed to preserve the proper operating relationships between the components.

It will be understood from the foregoing that the invention contemplates the use of a single time recorder unit for recording sound or noise levels at various intensities and at different times. It also contemplates the simultaneous recording of several different sound levels. In the case of FIG. 4, it contemplates, in addition, the analysis of specific bands of sound frequency as well as sound levels in decibels. It will be understood that the recording devices of FIGS. 3 and 4 preferably operate on the same general principles as those described in FIGS. 2 and 2A above.

It will also be apparent that various modifications in each or all of the several components may be made, as will occur to those skilled in the art. Obviously, vacuum tubes may be substituted for transistors and vice versa, although it is preferred in the case of the small personal recorders as in FIG. 1, to use electronic components of the most compact type suitable for the purpose.

Other modifications will suggest themselves to those skilled in the art and it is understood that such will be covered by the following claims so far as their proper scope and the state of the prior art permit.

What is claimed is:

1. In a noise analyzer and quantizer, the combination which includes a microphone, an amplifying and transmitting circuit connected to said microphone for producing an output signal proportional to the sound intensity levels experienced by said microphone, a time recording device, a constant potential source for applying operating power to said recording device, a triggering device connected to the amplifying and transmitting circuit to discriminate between output sound intensity levels respectively above and below a predetermined critical value, and to connect said constant potential source to said recording device only during the time while said intensity level is above said critical value; said recording device including an electrochemical recorder unit adapted to transfer a conductive metal across a gap and thereby cause a visual scalar recording operation to be performed which is directly proportional to the total of the time that said sound intensity level has exceeded said predetermined critical value irrespective of the degree to which said critical value has been exceeded.

2. In a noise analyzer and quantizer according to claim 1, the additional feature comprising a band pass filter for receiving the output signal of said amplifying and transmitting circuit whereby only signals representing sounds of selected frequencies are transmitted to said triggering device.

3. In a noise analyzer and quantizer according to claim 2, the additional feature of multiple trigger devices and multiple recorders connected to said band pass filter whereby multiple critical sound classifications can be quantized during a single run.

4. The combination according to claim 1 wherein said amplifying and transmitting circuit includes a transistor amplifier second stage and a miniature vacuum tube first stage for matching the impedance of said microphone to the impedance of said second stage.

References Cited by the Examiner

UNITED STATES PATENTS

| | | | |
|---|---|---|---|
| 2,799,784 | 7/1957 | Harris et al. | 330—3 |
| 2,884,085 | 4/1959 | Von Wittern et al. | 181—.5 |
| 3,014,550 | 12/1961 | Gales et al. | 181—.5 |
| 3,045,178 | 7/1962 | Corrsin | 324—68 |
| 3,144,089 | 8/1964 | Lane et al. | 181—.5 |
| 3,167,150 | 1/1965 | Darby et al. | 181—.5 |

OTHER REFERENCES

Cox, J. R., Jr.; The Noise Cumulator. In Noise Control, 5(1): pp. 54–58, 78; January 1959.

BENJAMIN A. BORCHELT, *Primary Examiner.*

CHESTER L. JUSTUS, *Examiner.*